2,944,070

PREPARATION OF 16α-LOWER ALKYL STEROIDS

Janos Kollonitsch, Westfield, Roger J. Tull, Plainfield, and Leonard M. Weinstock, Clifton, N.J., assignors to Merck & Co., Inc., Rahway, N.J., a corporation of New Jersey No Drawing. Filed Sept. 8, 1958, Ser. No. 759,444

20 Claims. (Cl. 260—397.45)

This invention relates to an improved process for the introduction of a hydrocarbon radical at the beta position of an α,β-unsaturated ketone. More particularly, it is concerned with methods of introducing a hydrocarbon substituent in α,β-unsaturated ketones of the steroid series.

It is known that certain α,β-unsaturated ketones can be reacted with organo-metallic reagents such as hydrocarbon compounds of cadmium and zinc, for example, dialkyl or diaryl cadmium, to produce the corresponding β-hyrocarbon substituted compounds. However, when such organo-metallic compounds are reacted with certain α,β-unsaturated ketones, for example, such ketones of the steroid series, the yield of the desired β-substituted compound is low and this method is therefore unsuitable for commercial production.

It is one object of the present invention to provide an improved method of producing β-substituted derivatives of α,β-unsaturated ketones by the reaction of such ketones with hydrocarbon compounds of cadmium and zinc. Another object is to provide an improved method for the preparation of 16α-lower alkyl compounds of the steroid series. Other objects will be apparent from the detailed description of our invention hereinafter provided.

In accordance with the present invention, it is now found that improved yields of β-substituted derivatives of α,β-unsaturated ketones are obtained by reacting the α,β-unsaturated ketones with the hydrocarbon compounds of cadium or zinc in the presence of magnesium and copper halides. The presence of these magnesium and copper salts makes it possible to obtain enhanced yields of the desired β substituted derivatives.

The process of the present invention is particularly useful in the preparation of 16α-lower alkyl steroid compounds. In this process the Δ¹⁶-20-keto steroid is intimately contacted with a metal di lower alkyl in the presence of the magnesium and copper halides to form the corresponding β-alkyl enol derivative which upon reaction with water is converted to the corresponding 16α-alkyl-20-keto steroid. This reaction sequence can be shown by partial structures as follows:

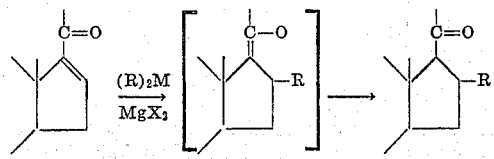

wherein R represents a lower alkyl group, M represents a metal from the group consisting of zinc and cadmium, and X is a halogen having an atomic weight greater than 35.

In carrying out the first step of this process the α,β-unsaturated ketone is intimately contacted with the metal di-lower alkyl in the presence of magnesium and copper halides; the reaction being preferably effected in the presence of a suitable solvent such as diethyl ether.

Pursuant to another embodiment of this invention, it is preferred to prepare the metal di-lower alkyl in situ by reacting the appropriate alkyl magnesium halide wherein the halo substituent has an atomic weight greater than 35 with the metal salt in ether solution and then adding a copper salt to the resulting reaction mixture. The α,β-unsaturated ketone is then intimately contacted with the reaction mixture at room temperature for sufficient time, usually at least 3–5 hours to complete the reaction and the formation of the desired 16α-lower alkyl compound. If desired, the time for carrying out the reaction can be shortened by warming the reaction mixture, for example, heating the reaction mixture under reflux.

The quantity of the copper salt is not critical in the reaction, but generally it is necessary to use an amount of copper halide equivalent to at least 10 mole percent based on the weight of the α,β-unsaturated ketone being reduced. Usually, it is preferred to use about 40 mole percent since with such amounts maximum yields of the desired alkyl product are obtained under optimum conditions. Greater amounts of copper salts can also be used, although amounts in excess of about 50 mole percent are generally unnecessary.

The amount of the magnesium salt present in the reaction mixture is also not critical, and an amount equivalent to about 25 mole percent based on the dialkyl metal compound is generally sufficient. However, as indicated above, it is generally preferred to prepare the metal dialkyl in situ by reaction of the appropriate alkyl magnesium halide with a salt of the metal whereupon two equivalents of the magnesium halide are formed and are present in the resulting reaction mixture.

Pursuant to a further embodiment of the present invention, it is found that the reaction can be effected more smoothly if, after the addition of the metal salt to the solution of the alkyl magnesium halide, the copper salt is added and permitted to react for a short time before the addition of the α,β-unsaturated ketone.

Thus, in accordance with the foregoing description metal di-lower alkyls such as dimethyl cadmium, diethyl zinc, dipropyl zinc, dibutyl cadmium, diamyl zinc, and the like are reacted with Δ¹⁶-20-ketone steroids to produce the corresponding 16α-lower alkyl enol derivative. The dialkyl metal compounds are most conveniently obtained by reacting the appropriate alkyl magnesium halide with an inorganic metal salt of zinc or cadmium to produce the desired dialkyl metal compound in situ, for example, reacting methyl magnesium bromide with cadmium chloride to produce dimethyl cadmium, ethyl magnesium iodide with zinc chloride to produce diethyl zinc, propyl magnesium chloride with cadmium bromide to produce dipropyl cadmium, amyl magnesium bromide with cadmium chloride to produce diamyl cadmium, and the like.

The β-alkyl enol derivative prepared in situ by the method described above can be readily converted to the corresponding 20-enol acylate by reaction with an acylating agent in accordance with procedures described in the co-pending application Serial No. 759,425 filed September 8, 1958. The enol acylate obtained in this manner can then be oxidized to introduce the 17α-hydroxy substituent pursuant to methods known in this art.

Alternatively, and in accordance with a further embodiment of the present invention, the β-lower alkyl enol derivative can be converted to the corresponding 16α-alkyl-20-keto steroid by reaction with water. Generally, it is preferred to carry out this step by intimately contacting the reaction mixture containing the β-alkyl enol derivative with an aqueous solution of a non-oxidizing acid such as hydrochloric, hydrobromic, sulfuric, and the like. Alternatively, an aqueous solution of an acid salt such as ammonium chloride, ammonium sulphate, sodium acid sulfate, and the like can similarly be used to convert the β-lower alkyl enol derivative to the β-lower alkyl-20-keto steroid.

The process of this invention is especially useful in converting $\Delta^{16}$-20-keto steroids of the pregnane and allopregnane series to the corresponding 16α-alkyl steroids. These $\Delta^{16}$-20-keto pregnanes and allopregnanes may have other unsaturated linkages, and or other substituents such as keto, acyloxy, alkyl groups, and the like in rings A, B, and C. Examples of such $\Delta^{16}$-20-keto steroids that might be mentioned are 3-acyloxy-16-pregnene-11,20-dione,
3-acyloxy-16-allopregnene-11,20-dione,
3-acyloxy-9(11),16-pregnadiene-20-one,
3-acyloxy-9(11),
16-allopregnadiene-20-one,
3-acyloxy-16-pregnene-20-one,
3-acyloxy-16-allopregnene-20-one,
2-alkyl-3-acyloxy-16-allopregnene-20-one,
3-acyloxy-6-alkyl-16-pregnene-11,20-dione,
16-pregnene-3,11,20-trione,
16-allopregnene-3,11,20-trione,
3,21-diacyloxy-16-pregnene-11,20-dione,
3,21-diacyloxy-16-allopregnene-11,20-dione,
3,21-diacyloxy-9(11),16-pregnadiene-20-one,
3,21-diacyloxy-9(11),16-allopregnadiene-20-one, and the like.

The 16α-alkyl compounds prepared by the processes of the present invention are useful intermediates in the production of steroid compounds having cortisone-like activity such as 16α-methylprednisone, 16α-methyl prednisolone, 9α-fluoro-16α-methyl prednisolone, and the like.

The following examples are illustrative of the processes of the present invention.

EXAMPLE 1

*Preparation of 16α-methyl-3-acetoxy-pregnane-11,20-dione*

To a suspension of 40.4 g. of dry cadmium chloride and 2 g. of cuprous chloride in 200 cc. of dry ether was added 136 cc. of methyl magnesium bromide solution (3 molar) over a period of 10 minutes at a temperature of 32–34° C. under nitrogen. The mixture was boiled under reflux for two hours. The mixture was cooled to 30° C. and a solution of 18.6 g. of $\Delta^{16}$-pregnene-3α-ol-11,20-dione acetate was added over a period of 5 minutes. The mixture was allowed to stir at 30–35° C. for 17 hours. To the mixture was added a solution of 34 cc. of concentrated hydrochloric acid and 140 cc. of water keeping the temperature at 15–25°. After stirring for 30 minutes the layers were separated and the ether layer was washed successively with 100 cc. of water, 100 cc. of saturated sodium bicarbonate solution and 100 cc. of water. The ether solution was dried over magnesium sulfate and concentrated to a volume of 60 cc. The slurry was cooled in an ice bath, filtered and the cake washed with 20 cc. of ether. The yield of 16α-methylpregnane-3α-ol-11,20-dione acetate was 83.5%, M.P. 152–153° C.

EXAMPLE 2

*Preparation of 16α-methyl-3-acetoxy-pregnane-11,20-dione*

7 g. of fused (and pulverized) $ZnCl_2$ and 0.5 g. cuprous chloride was mixed with 50 ml. dry ether; 34 ml. (3 molar) ethereal methylmagnesium bromide solution was added with stirring and the mixture refluxed under nitrogen for one hour (Gilman test faintly positive). To the reddish brown suspension was added a solution of 4.65 g. of $\Delta^{16}$-pregnene-3α-ol-11,20-dione acetate in 200 ml. dry ether at 30–34° C. over 3 minutes. The mixture was stirred at 26–27° C. for 66 hours.

To the mixture was added a solution of 10 ml. of concentrated hydrochloric acid in 20 ml. of water, with stirring. After 30 minutes the layers were separated, the ether layer washed successively with water, sodium bicarbonate solution and water. The solution was dried over magnesium sulfate and evaporated to dryness. There was obtained 4.1 g. of crystals, M.P. 135–145° C. After recrystallization from 12 ml. of isopropanol, 3.2 g. of 16α-methyl-3-acetoxy-pregnane-11,20-dione was obtained, melting at 148–150° C. The product did not depress the melting point of an authentic sample of 16α-methylpregnan-3-ol-11,20-dione acetate.

EXAMPLE 3

*Preparation of 16α-n-propyl-3-acetoxy-pregnane-3,11-dione* n-Propylmagnesium bromide was prepared from 12.3 g. of n-propyl bromide and 2.4 g. of magnesium in 40 ml. of ether. The Grignard reagent was added to a suspension of 10.12 gms. of cadmium chloride and 0.5 gm. of cuprous chloride in 50 ml. of ether and the mixture was refluxed under nitrogen for one and one-half hours. To the mixture was added a solution of 4.65 gms. of $\Delta^{16}$-pregnen-3α-ol-11,20-dione acetate in 200 ml. of ether and the mixture stirred 48 hours at 32° C. To the reaction mixture was added a solution of 9 ml. of concentrated hydrochloric acid in 30 ml. of water. The ether layer was washed in the usual manner, dried over magnesium sulfate and evaporated to dryness. After treatment of one-half of the residue with Girard's reagent "T," the ketonic fraction weighed 1.71 gms. This material was treated with 7 ml. of pyridine and 7 ml. of acetic anhydride at 70° for 20 minutes. The solution was poured into water, extracted with ether and the ether layer washed with dilute hydrochloric acid, sodium bicarbonate and evaporated to dryness. After recrystallization from ether and isopropanol there was obtained 0.3 gm. of 16α-n-propyl-3-acetoxy-pregnane-3,11-dione, M.P. 163–165° C.

*Analysis.*—Calc'd for $C_{26}H_{40}O_4$: C, 74.67%; H, 9.68%. Found: C, 74.94%; H, 9.65%.

EXAMPLE 4

*Preparation of 16α-methyl-3-acetoxy-9(11)-pregnene-20-one*

To a suspension of 2.17 gms. of cadmium chloride and 0.11 gm. of cuprous chloride in 11 ml. of ether was added 7.3 ml. of 3 molar methylmagnesium iodide in ether. The mixture was boiled under reflux under nitrogen for one and one-half hours. To the mixtture was added a solution of 1 gm. of 3-acetoxy-9(11),16-pregnadiene-20-one in 43 ml. of ether and the mixture refluxed with stirring for 16 hours. After decomposition of the mixture in the usual manner and recrystallization of the crude product from petroleum ether, there was obtained 0.8 g. of 16α-methyl-3-acetoxy-9(11)-pregnene-20-one, M.P 146–148° C.

*Analysis.*—Calc'd for $C_{24}H_{36}O_3$: C, 77.35%; H, 9.7%. Found: C, 77.59%; H, 9.65%.

The 3α-acetoxy-9(11),16-pregnadiene-20-one used as the starting material in this example can be prepared starting with the known compound, 3α-acetoxy-11β-hydroxy-pregnane-20-one, as follows: The starting compound is reacted with bromine in chloroform at 0–5° C. to form the corresponding 17,21-dibromo compound. Upon treating the chloroform solution containing the 17, 21-dibromo compound with gaseous hydrogen bromide at a temperature of about 40–45° C., 3α-acetoxy-17,21-dibromo-9(11)-pregnene-20-one is obtained. Reaction of this product in acetone with sodium iodide affords 3α-acetoxy-17-bromo-21-iodo-9(11) pregnen-20-one which upon treatment with sodium bisulfite is converted to 3α-acetoxy-17-bromo-9(11)-pregnene-20-one. Heating this compound with pyridine under reflux for about 6 hours produces 3α-acetoxy-9(11),16-pregnadiene-20-one. These reactions are described in detail in the copending application of Frank A. Cutler, Jr. and John M. Chemerda, Serial No. 748,178, filed July 14, 1958.

The 16α-lower alkyl compounds prepared in accordance with the methods of this invention are useful intermediates in the preparation of compounds such as 16α-methyl-9α-fluoro prednisolone, 16α-methylprednisone, 16α-methyl prednisolone and the like. These compounds have cortisone-like activity and are useful anti-inflammatory agents especially effective in the treatment of arthritis and related diseases. Thus, 16α-methyl-3α-acetoxy-pregnane-11,20-dione which is reacted with aqueous methanolic hydrochloric acid to form 16α-methyl-3α-hydroxy-pregnane-11,20-dione. The latter compound, which is a potent anesthetic, is reacted with acetic anhydride in the presence of p-toluene sulfonic acid catalyst to form a mixture of enol acetate containing 16α-methyl - 3α,20 - dihydroxy - 17,20 - pregnene - 11 - one 3,20-diacetate; this mixture, after chromatographic purification over acid washed alumina to remove any unchanged starting material, is reacted with perbenzoic acid and the resulting 16α-methyl-17α,20-epoxy-3α,20-dihydroxy-pregnane-11-one 3,20-diacetate is hydrolyzed with methanolic potassium bicarbonate to produce 16α-methyl-3α,17α-dihydroxy-pregnane-11,20-dione. The latter compound is reacted with bromine in chloroform to form 21 - bromo - 16α - methyl - 3α, 17α - dihydroxy - pregnane-11,20-dione which is reacted with sodium iodide in acetone to produce 21-iodo-16α-methyl-3α,17α-dihydroxy-pregnane-11,20-dione which is converted without isolation to 16α - methyl - 3α,17α,21-trihydroxy-pregnane-11,20-dione 21-acetate by reaction with anhydrous potassium acetate; this compound is reacted with chromium trioxide in pyridine to form 16α-methyl-17α,21-dihydroxy pregnane-3,11,20-trione 21-acetate. The 16α-methyl-16α, 21-dihydroxy-pregnane-3,11,20-trione 21-acetate is reacted with bromine in glacial acetic acid-chloroform to produce 4-bromo-16α-methyl-17α,21-dihydroxy-pregnane-3, 11,20-trione, which is then reacted with semicarbazide to form 16α-methyl-17α,21-dihydroxy-4-pregnene-3,11,20-trione 3,20-bissemicarbazone 21-acetate. This 3,20-bissemicarbazone is reacted with sodium borohydride to form 16α - methyl - 11β,17α,21 - trihydroxy - 4 - pregnene - 3,20 - dione 3,20 - bissemicarbazone which is hydrolyzed under acid conditions to form 16α-methyl-11β, 17α,21-trihydroxy-4-pregnene-3,20-dione. This latter compound is then converted to the corresponding 1,4-pregnadiene compound by contacting it with the dehydrogenating activity of microorganisms of the class Schizomycetes, for example, Bacillus sphaericus (ATCC–245) or Nocardia asteroides (ATCC 9970). The 16α-methyl - 11β,17α,21 - trihydroxy - 1,4 - pregnadiene - 3,20-dione so obtained is then reacted with acetic anhydride in the presence of pyridine to produce the corresponding 16α - methyl - 11β,17α,21 - trihydroxy - 1,4 - pregnadiene-3,20-dione-21-acetate.

This compound can also be called 16α-methylprednisolone acetate. Alternatively, the 16α-methyl-11β,17α, 21-trihydroxy-4-pregnene-3,20-dione, obtained as described above, upon reaction with acetic anhydride in pyridine, gives the corresponding 21-acetate which is reacted with methane sulfonyl chloride followed by potassium acetate, or phosphorus oxychloride, to produce 16α - methyl - 4,9(11) - pregnadiene - 17α,21 - diol - 3,20-dione 21-acetate; the latter compound is reacted with hypobromous acid to produce 9α-bromo-16α-methyl - 4 - pregnene - 11β,17α,21 - triol - 3,20 - dione 21 - acetate which is reacted with anhydrous potassium acetate in ethanol to produce 16α - methyl - 9,11 - epoxy - 4 - pregnene - 17α,21 - diol - 3,20 - dione 21 - acetate. This 9,11-epoxide is then reacted with hydrogen fluoride in tetrahydrofuran to produce 16α - methyl - 9α - fluoro-4 - pregnene - 11β,17α,21 - triol - 3,20 - dione 21 - acetate; this compound is reacted with a hydrolyzing agent to form 16α - methyl - 9α - fluoro - 4 - pregnene - 11β,17α,21 - triol - 3,20 - dione 21 - free alcohol. The latter compound can be similarly dehydrogenated by contact with the dehydrogenating activity of microorganisms of the class Schizomycetes to produce 16α - methyl - 9α - fluoro - 11β,21 - dihydroxy - 1,4 - pregnadiene - 3,20-dione (9α - fluoro - 16α - methyl - prednisolone). These reactions are described in detail in the co-pending application of Arth, Johnston and Sarett, Serial No. 642,655, filed February 27, 1957.

Alternatively, the 16α - methyl - 3 - acetoxy - 9(11) - pregnen-20-one prepared as described in the above examples can be converted to 16α - methyl - 11β,17α,21 - trihydroxy - 1,4 - pregnadiene - 3,20 - dione as follows: The starting material is treated with hypobromous acid to produce 9α - bromo - 16α - methyl - 3 - acetoxy - 11β-hydroxypregnan-20-one which is reacted with potassium acetate in ethanol to produce 16α - methyl - 9,11 - oxido - 3 - acetoxy - pregnan - 20 - one. This 9,11 oxide is then reacted with hydrogen fluoride in tetrahydrofuran to produce 16α - methyl - 9α - fluoro - 11β - hydroxy - 3-acetoxy-pregnan-20-one.

The 16α - methyl - 9α - fluoro - 11β - hydroxy - 3-acetoxy-pregnan-20-one or 16α-methyl-3-acetoxy-11β-hydroxy-pregnan-20-one compounds are then treated microbiologically to introduce hydroxy substituents at positions 17 and 21 of the molecule to produce 16α-methyl - 9α - fluoro - 3,11β,17α,21 - tetrahydroxy-pregnan-20-one or 3,11β,17α,21-tetrahydroxy-pregnan-20-one respectively. These compounds are then subjected to a further microbiological treatment by contacting them with a growing culture of Nocardia blackwellii to oxidize the 3-hydroxy group to a 3-keto group and introduce double bonds into the A-ring of the molecule at positions 1,2 and 4,5 thereby producing 16α-methyl-9α-fluoro-11β, 17α,21 - trihydroxy - 1,4 - pregnadiene - 3,20 - dione and 16α-methyl-11β,17α,21-trihydroxy-1,4-pregnadiene-3, 20-dione respectively.

Various changes and modifications may be made in carrying out the present invention without departing from the spirit and scope thereof. Insofar as these changes and modifications are within the purview of the annexed claims, they are to be considered as part of our invention.

What is claimed is:

1. A process which comprises intimately contacting a $\Delta^{16}$-20-keto steroid of the pregnane and allopregnane series with a metal di lower alkyl of the formula $(R)_2M$, wherein R represents a lower alkyl and M represents a metal from the group consisting of zinc and cadmium in the presence of magnesium and copper halides wherein the halogen has an atomic weight greater than 35 to produce the corresponding 16α-lower alkyl enol derivative.

2. The process of claim 1 in which the metal dialkyl is prepared in situ by reacting a Grignard reagent of the formula RMgX wherein R is a lower alkyl and X is a halogen having an atomic weight greater than 35 with a metal salt from the group consisting of zinc and cadmium.

3. The process of claim 1 in which the metal di lower alkyl is dimethyl cadmium.

4. The process of claim 1 in which the metal di lower alkyl is dimethyl zinc.

5. The process of claim 1 in which the $\Delta^{16}$-20-keto steroid is 3α-acetoxy-16-pregnene-11,20-dione.

6. The process of claim 1 in which the $\Delta^{16}$-3-keto steroid is 3α-acetoxy-9(11),16-prednadiene-20-one.

7. A process which comprises intimately contacting a $\Delta^{16}$-20-keto steroid of the pregnane and allopregnane series with a metal di lower alkyl of the formula $(R)_2M$, wherein R represents a lower alkyl and M represents a metal from the group consisting of zinc and cadmium, in the presence of magnesium and copper halides wherein the halogen has an atomic weight greater than 35 to produce the corresponding β-alkyl enol derivative, and decomposing this enol derivative by reaction with water to produce the corresponding 16α-lower alkyl-20-keto steroid.

8. The process of claim 7 in which the metal di lower alkyl is prepared in situ by reacting a Grignard reagent of the formula RMgX, wherein R is a lower alkyl and X is a halogen, having an atomic weight greater than 35 with a metal salt from the group consisting of zinc and cadmium.

9. The process of claim 7 in which the metal di lower alkyl is dimethyl cadmium.

10. The process of claim 7 in which the metal di lower alkyl is dimethyl zinc.

11. The process of claim 7 in which the $\Delta^{16}$-20-keto steroid is 3α-acetoxy-16-pregnene-11,20-dione.

12. The process of claim 7 in which the $\Delta^{16}$-20-keto steroid is 3α-acetoxy-9(11),16-pregnadiene-20-one.

13. The process which comprises intimately contacting zinc chloride with methyl magnesium bromide in the presence of a copper salt and adding 3α-acetoxy-16-pregnene-11,20-dione to the resulting reaction mixture to produce the corresponding β-methyl enol derivative.

14. The process of claim 13 in which the β-methyl enol derivative is further reacted with water to produce 3α-acetoxy-16α-methyl-pregnane-3,20-dione.

15. The process which comprises intimately contacting cadmium chloride with methyl magnesium bromide in the presence of a copper salt and adding 3α-acetoxy-16-pregnene-11,20-dione to the resulting reaction mixture to produce the corresponding β-methyl enol derivative.

16. The process of claim 15 in which the β-methyl enol derivative is further reacted with water to produce 3α-acetoxy-16α-methyl-pregnane-11,20-dione.

17. The process which comprises intimately contacting cadmium chloride with methyl magnesium bromide in the presence of a copper salt and adding 3α-acetoxy-9(11),16-pregnadiene-20-one to the resulting reaction mixture to produce the corresponding β-methyl enol derivative.

18. The process of claim 17 in which the β-methyl enol derivative is further reacted with water to produce 3α-acetoxy-16α-methyl-9(11)-pregnene-20-one.

19. The process which comprises intimately contacting cadmium chloride with n-propyl magnesium bromide in the presence of a copper salt, and adding 3α-acetoxy-16-pregnene-11,20-dione to the resulting reaction mixture to produce the corresponding β-n-propyl enol derivative.

20. The process of claim 19 in which the β-n-propyl enol derivative is further reacted with water to produce 3α-acetoxy-16α-n-propyl-pregnane-11,20-dione.

No references cited.